(12) United States Patent
Murayama et al.

(10) Patent No.: US 10,065,510 B2
(45) Date of Patent: Sep. 4, 2018

(54) POWER TRANSMISSION SYSTEM

(71) Applicant: IHI CORPORATION, Tokyo (JP)

(72) Inventors: Takahiko Murayama, Tokyo (JP); Yuji Maekawa, Tokyo (JP); Yuji Takatsu, Tokyo (JP); Kazushige Doke, Tokyo (JP)

(73) Assignee: IHI CORPORATION, Tokyo (JP)

( * ) Notice: Subject to any disclaimer, the term of this patent is extended or adjusted under 35 U.S.C. 154(b) by 252 days.

(21) Appl. No.: 14/955,414

(22) Filed: Dec. 1, 2015

(65) Prior Publication Data

US 2016/0089985 A1 Mar. 31, 2016

Related U.S. Application Data

(63) Continuation of application No. PCT/JP2013/069018, filed on Jul. 11, 2013.

(51) Int. Cl.
| | | |
|---|---|---|
| *H02J 50/12* | (2016.01) | |
| *H02J 50/80* | (2016.01) | |
| *B60L 11/18* | (2006.01) | |
| *H02J 5/00* | (2016.01) | |
| *H02J 7/02* | (2016.01) | |

(52) U.S. Cl.
CPC ............. *B60L 11/18* (2013.01); *H02J 5/005* (2013.01); *H02J 7/025* (2013.01); *H02J 50/12* (2016.02); *H02J 50/80* (2016.02)

(58) Field of Classification Search
CPC . B60L 11/18; H02J 5/005; H02J 50/12; H02J 50/80; H02J 7/025
USPC ................................................ 307/10.1, 104
See application file for complete search history.

(56) References Cited

U.S. PATENT DOCUMENTS

| | | | | |
|---|---|---|---|---|
| 8,716,974 | B2* | 5/2014 | Sakoda | B60L 11/182 320/108 |
| 9,143,011 | B2* | 9/2015 | Kamata | H02J 7/025 |
| 2011/0109263 | A1 | 5/2011 | Sakoda et al. | |
| 2011/0266880 | A1* | 11/2011 | Kim | H02J 50/12 307/104 |
| 2012/0309304 | A1* | 12/2012 | Kim | H04B 5/0031 455/41.1 |

(Continued)

FOREIGN PATENT DOCUMENTS

| | | |
|---|---|---|
| CN | 102969776 A | 3/2013 |
| JP | 07-322517 A | 12/1995 |

(Continued)

OTHER PUBLICATIONS

International Search Report, PCT/JP2013/069018, Aug. 6, 2013, 1 pg.

(Continued)

*Primary Examiner* — William Hernandez
(74) *Attorney, Agent, or Firm* — Volpe and Koenig, P.C.

(57) ABSTRACT

The power transmission system includes a power transmitting device that transmits AC power and a power receiving device that receives the AC power. The power receiving device includes a rectifier that converts the received AC power into DC power, a DC converter that performs DC conversion on the DC power output from the rectifier, and a power-receiving side controller that calculates, based on an input voltage of the DC converter, a current command value making input impedance of the DC converter equal to a preset value and controls the DC converter so that an input current of the DC converter equals the current command value.

12 Claims, 2 Drawing Sheets

(56) References Cited

U.S. PATENT DOCUMENTS

| | | | |
|---|---|---|---|
| 2013/0049475 A1* | 2/2013 | Kim | H02J 5/005 307/75 |
| 2013/0082648 A1 | 4/2013 | Kamata | |
| 2013/0154556 A1 | 6/2013 | Takahashi et al. | |
| 2014/0103711 A1* | 4/2014 | Ichikawa | H02J 7/025 307/10.1 |
| 2014/0152251 A1* | 6/2014 | Kim | H02J 7/025 320/108 |
| 2014/0361738 A1* | 12/2014 | Lee | H02J 7/025 320/108 |
| 2015/0229132 A1* | 8/2015 | Katsunaga | B60L 11/182 307/104 |
| 2015/0246617 A1* | 9/2015 | Shijo | H02J 5/005 320/108 |
| 2015/0263531 A1* | 9/2015 | Kozakai | H02J 5/005 307/104 |
| 2015/0340881 A1* | 11/2015 | Nakano | H02J 5/005 307/104 |

FOREIGN PATENT DOCUMENTS

| | | |
|---|---|---|
| JP | 2004-153879 | 5/2004 |
| JP | 2010-252468 A | 11/2010 |
| JP | 2011-066985 A | 3/2011 |
| JP | 2011-120443 A | 6/2011 |
| JP | 2011-147271 A | 7/2011 |
| JP | 2012-257395 A | 12/2012 |
| JP | 2013-078171 A | 4/2013 |
| JP | 2013-528043 A | 7/2013 |
| WO | 2011/127449 | 10/2011 |
| WO | 2012/168777 A2 | 12/2012 |

OTHER PUBLICATIONS

Japanese Office Action with English concise explanation, Japanese Patent Application No. 2012-085326, dated Sep. 16, 2014, 4 pgs.

Japanese Office Action with English concise explanation, Japanese Patent Application No. 2012-085326, dated Mar. 17, 2015, 5 pgs.

\* cited by examiner

POWER TRANSMISSION SYSTEM

This application is a Continuation Application based on International Application No. PCT/JP2013/069018, filed on Jul. 11, 2013, the content of which is incorporated herein by reference.

TECHNICAL FIELD

The present disclosure relates to a power transmission system.

BACKGROUND ART

Wireless power supply methods such as an electromagnetic induction method, a radio wave receiving method, an electric field coupling method, and a magnetic field resonance method are known. Among these methods, the magnetic field resonance method relates to a technique in which each of the side of a power transmitting device and the side of a power receiving device includes an LC resonance circuit, which is made up of a coil and a capacitor, and a magnetic field between the two LC resonance circuits is resonated to wirelessly transmit electric power (see Japanese Unexamined Patent Application, First Publication No. 2011-147271).

In comparison with the electromagnetic induction method that is widely put to practical use, the magnetic resonance method is possible to realize highly efficient and long-distance power transmission under a weak magnetic field, and is attracting attention as a next-generation wireless power transmission technique available for charging portable terminals, electric vehicles, and the like.

SUMMARY OF INVENTION

Technical Problem

The power transmission system of the wireless power supply method is made up of a power transmitting device that wirelessly transmits alternating current power supplied from an alternating current power source via a space transmission path, and a power receiving device that wirelessly receives the alternating current power via the space transmission path. The power receiving device may be equipped with a rectifier for rectifying the received alternating current power for conversion into direct current power, and a charger (a direct current converter, for instance a DC-DC converter) for performing direct current conversion of the direct current power output from the rectifier.

When output of the DC-DC converter is used to charge a power storage device such as a storage battery, input impedance of the DC-DC converter is preferably constant in a charging period from the viewpoint of power-transmitting efficiency. However, since the input impedance is changed along with a change in input current at the time of transition (start and stop of charging), the input impedance is not matched, and the power-transmitting efficiency is likely to be reduced.

If the input impedance is not matched, excessive electrical stress and damage are likely to occur in each constituent element. In addition, the electric power to be obtained under ordinary circumstances may not be secured.

The present disclosure is conceived in view of the above-described circumstances, and an object of the present disclosure is to provide a power transmission system capable of realizing an improvement in power-transmitting efficiency and avoiding damage to constituent elements.

Solution to Problem

To achieve the object described above, according to a first aspect of the present disclosure, there is provided a power transmission system that includes: a power transmitting device configured to convert supplied alternating current (AC) or direct current (DC) power into AC power and transmit the converted AC power via a transmission path; and a power receiving device configured to receive the AC power via the transmission path. The power receiving device includes: a rectifier configured to rectify the AC power received via the transmission path to DC power; a DC converter configured to perform DC conversion on the DC power output from the rectifier; and a power-receiving side controller configured to calculate, based on an input voltage of the DC converter, a current command value making input impedance of the DC converter equal to a preset value and to control the DC converter so that an input current of the DC converter equals the current command value.

According to a second aspect of the present disclosure, in the first aspect, the power transmitting device includes: an AC converter configured to convert the supplied AC or DC power into the AC power; and a power-transmitting side controller configured to control a gain of the AC power in the AC converter. The power-receiving side controller is configured to transmit the current command value to the power-transmitting side controller. The power-transmitting side controller is configured to control the gain of the AC power in the AC converter based on the current command value received from the power-receiving side controller so that input electric power of the DC converter is constant.

According to a third aspect of the present disclosure, in the first or second aspect, the power transmitting device includes a power-transmitting side resonator for wirelessly transmitting the AC power via a space transmission path serving as the transmission path under a magnetic field resonance method. The power receiving device includes a power-receiving side resonator for wirelessly receiving the AC power from the power-transmitting side resonator via the space transmission path.

According to a fourth aspect of the present disclosure, in any one of the first through third aspect, bidirectional power transmission is possible between the power transmitting device and the power receiving device.

According to a fifth aspect of the present disclosure, there is provided a power receiving device of a power transmission system that includes: a resonator configured to receive AC power transmitted from a power transmitting device; a rectifier connected to the resonator and configured to convert the AC power into DC power; a converter configured to perform DC conversion on the DC power and output the converted result; and a controller having functions of calculating a current command value making input impedance of the converter equal to a predetermined value based on an input voltage input to the converter, controlling the converter based on the current command value, and transmitting the current command value to the power transmitting device.

According to a sixth aspect of the present disclosure, in the fifth aspect, the power receiving device further includes an antenna configured to transmit the current command value output from the controller toward the power transmitting device.

According to a seventh aspect of the present disclosure, in the fifth aspect, the controller has a function of transmitting the current command value to the power transmitting device using a short-range radio communication standard.

According to an eighth aspect of the present disclosure, in the fifth aspect, the resonator receives the AC power from the power transmitting device using a magnetic field resonance method.

According to a ninth aspect of the present disclosure, there is provided an electric vehicle that includes: the power receiving device in the fifth aspect; and a storage battery connected to the converter.

According to a tenth aspect of the present disclosure, there is provided a power transmitting device for a power transmission system that includes: an amplifier configured to control electric power supplied from a predetermined power source to output AC power; a resonator configured to transmit the AC power input from the amplifier to a power receiving device; an antenna configured to receive and output a current command value transmitted from the power receiving device; and a controller configured to control a gain of the AC power output from the amplifier based on the current command value input from the antenna.

According to a eleventh aspect of the present disclosure, in the tenth aspect, the controller controls the gain of the AC power, which is output from the amplifier, based on the current command value such that input power input to a converter of DC power which is provided at the power receiving device becomes constant.

According to a twelfth aspect of the present disclosure, in the tenth aspect, the resonator transmits the AC power, which is input from the amplifier, to the power receiving device using a magnetic field resonance method.

According to a thirteenth aspect of the present disclosure, there is provided a charging facility installed in a parking lot including the power transmitting device in the tenth aspect.

According to a fourteenth aspect of the present disclosure, there is provided an amplifier configured to control power supplied from a predetermined power source to output AC power; a resonator configured to transmit the AC power input from the amplifier to a power receiving device; an antenna configured to receive and output a signal transmitted from the power receiving device; and a controller configured to control a gain of the AC power output from the amplifier based on the signal input from the antenna.

Effects of Invention

According to the present disclosure, since input impedance of the DC-DC converter provided at the side of the power receiving device is kept constant during an operating period of the DC-DC converter (including transition times when output start and output stop in addition to a steady time), the input impedance can always be maintained in a matched state. Therefore, in comparison with the related art, power-transmitting efficiency can be improved, and damage to a constituent element can be avoided. In addition, a maximum electric power point can be maintained.

DESCRIPTION OF EMBODIMENTS

Hereinafter, an embodiment of the present disclosure will be described with reference to the drawings.

Figure 1:
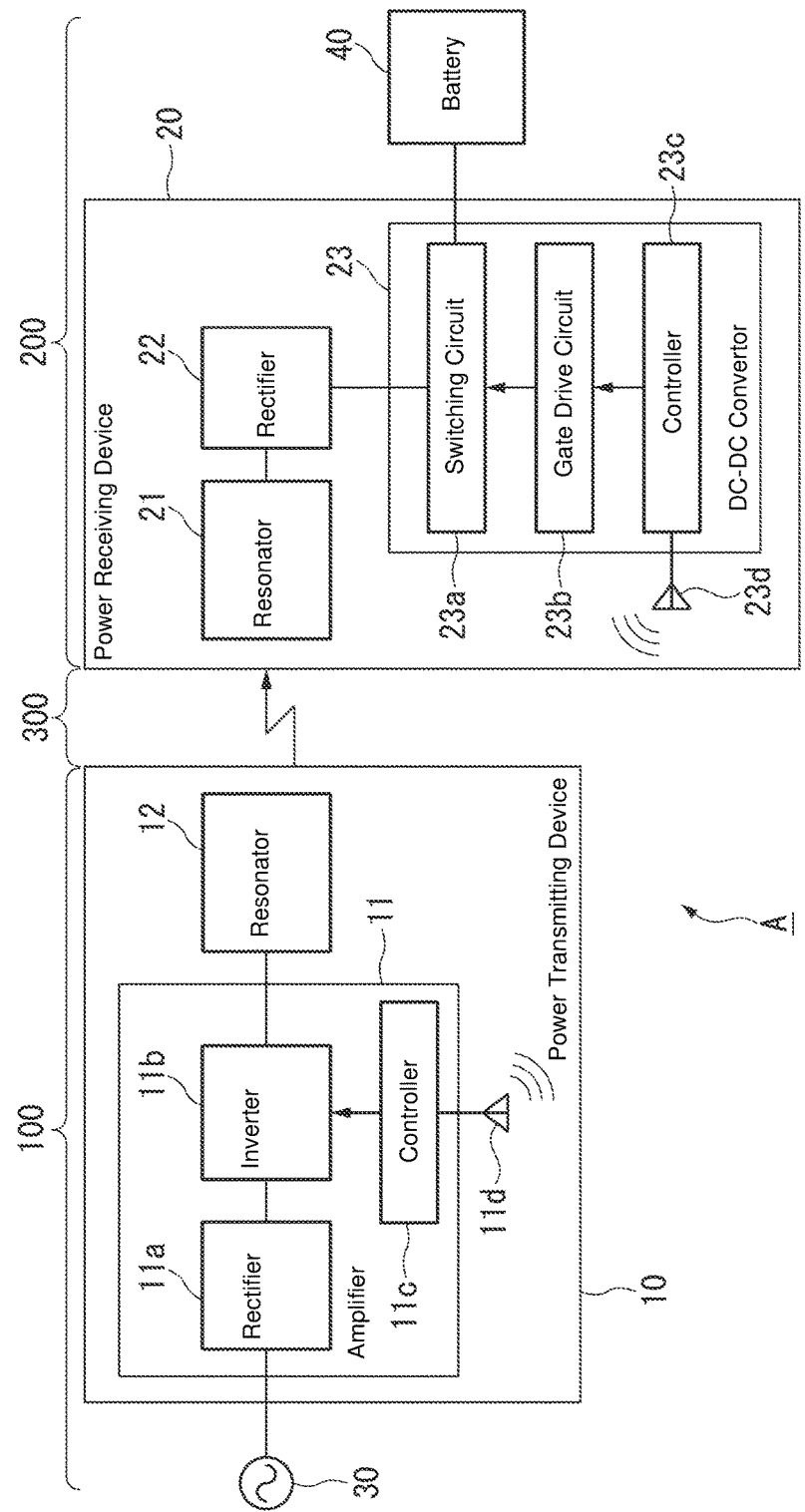
FIG. 1 is a schematic constitutional view of a power transmission system according to an embodiment of the present disclosure.

FIG. 1 is a schematic constitutional view of a power transmission system A according to the present embodiment. As shown in FIG. 1, the power transmission system A according to the present embodiment is, for instance, a power transmission system based on a wireless power supply system that wirelessly transmits charging power (alternating current (AC) power) from a charging facility 100 installed at a predetermined location such as in a parking lot to an electric vehicle 200 via a space transmission path (transmission path) 300. The power transmission system A includes a power transmitting device 10 mounted at the side of the charging facility 100, and a power receiving device 20 mounted at the side of the electric vehicle 200.

The power transmitting device 10 wirelessly transmits alternating current power supplied from an AC power source 30 (for example, a commercial power source having a single-phase voltage of 200 V and a frequency of 50 or 60 Hz) provided at the side of the charging facility 100 via the space transmission path 300. The power transmitting device 10 includes an amplifier 11 and a power-transmitting side resonator 12.

The amplifier 11 is an AC converting device that performs AC-AC conversion on the AC power supplied from the AC power source 30 and outputs the AC power obtained by the AC-AC conversion to the power-transmitting side resonator 12. To be specific, the amplifier 11 includes a rectifier circuit 11a that converts the AC power supplied from the AC power source 30 into direct current (DC) power, an inverter 11b that converts the DC power output from the rectifier circuit 11a into AC power having a predetermined voltage and a predetermined frequency and outputs the converted AC power to the power-transmitting side resonator 12, and a power-transmitting side controller 11c that controls a switching element such as a metal-oxide-semiconductor field-effect transistor (MOS-FET) constituting the inverter 11b. In the present embodiment, the rectifier circuit 11a and the inverter 11b are equivalent to an AC converter of the present disclosure.

The power-transmitting side controller 11c controls the switching element constituting the inverter 11b to control the voltage and frequency of the AC power output from the inverter 11b.

That is, by controlling the switching element constituting the inverter 11b, the power-transmitting side controller 11c controls a gain of the AC power in the amplifier 11. In addition, the power-transmitting side controller 11c includes an antenna 11d, and has a function of performing radio communication with a power-receiving side controller 23c (to be described below) using a short-range radio communication standard such as Bluetooth (registered trademark).

Further, the rectifier circuit 11a may be realized by a step-up chopper circuit or a step-up and step-down chopper circuit having a power factor correction (PFC) function. As the power-transmitting side controller 11c also controls a duty cycle of a chopper, performance of the gain control of the AC power in the amplifier 11 can be improved, for instance, a variable range of the gain can be widened.

The power-transmitting side resonator 12 is an LC resonance circuit made up of a coil wound in a spiral shape and a capacitor in order to wirelessly transmit the AC power input from the amplifier 11 via the space transmission path 300 based on a magnetic field resonance method. As the capacitor for constituting the power-transmitting side resonator 12, parasitic capacitance of the coil may be used, or a capacitor element may be separately provided.

The power receiving device 20 wirelessly receives the AC power, which is wirelessly transmitted from the power transmitting device 10 via the space transmission path 300, converts the received AC power into DC power for charging and supplies the converted DC power to a storage battery 40 such as a lithium-ion battery mounted at the side of the electric vehicle 200. The power receiving device 20 includes a power-receiving side resonator 21, a rectifier 22, and a DC-DC converter 23.

The power-receiving side resonator 21 is an LC resonance circuit made up of a coil wound in a spiral shape and a capacitor in order to wirelessly receive the AC power from the power-transmitting side resonator 12 via the space transmission path 300. When each circuit constant is set so that resonance frequencies of the resonators 12 and 21 of the power transmitting device 10 and the power receiving device 20 are equal to each other, highly efficient wireless power transmission is performed between the power-transmitting side resonator 12 and the power-receiving side resonator 21 by magnetic field resonance.

The space transmission path 300 is a space between the power-transmitting side resonator 12 and the power-receiving side resonator 21. The space transmission path 300 is typically filled with air; however, a non-conductive and non-magnetic material exerting no or little influence on an electromagnetic field generated for the wireless power transmission, for instance water or plastic, may be present.

The AC power output from the amplifier 11 is converted into magnetic energy by the power-transmitting side resonator 12 and is wirelessly transmitted. The magnetic energy is reconverted into the AC power by the power-receiving side resonator 21. The AC power obtained from the power-receiving side resonator 21 is output to the rectifier 22 provided at the following stage. The rectifier 22 rectifies the AC power input from the power-receiving side resonator 21, that is, converts the AC power into DC power, and outputs the obtained DC power to the DC-DC converter 23.

The DC-DC converter 23 performs DC conversion (DC-DC conversion) on the DC power input from the rectifier 22, and outputs the DC power obtained by the DC conversion to the storage battery 40 as charging DC power. To be specific, the DC-DC converter 23 includes a switching circuit (DC converter) 23a that steps down the DC power input from the rectifier 22 depending on an on-off action of a switching element such as a MOS-FET, a gate drive circuit 23b that generates a gate signal for turning on or off the switching element, and a power-receiving side controller 23c that controls the switching element of the switching circuit 23a via the gate drive circuit 23b. The switching circuit 23a is a circuit that performs the DC conversion on the DC power output from the rectifier 22 and is equivalent to the DC converter of the present disclosure.

The power-receiving side controller 23c is configured to monitor an input voltage of the DC-DC converter 23 (an output voltage of the rectifier 22), to calculate, based on the input voltage, a current command value making the input impedance of the DC-DC converter 23 equal to a preset value and to control the switching element of the switching circuit 23a so that an input current of the DC-DC converter 23 equals the current command value. In addition, the power-receiving side controller 23c includes an antenna 23d, and has a function of performing radio communication with the power-transmitting side controller 11c using a short-range radio communication standard such as Bluetooth (registered trademark).

The power-receiving side controller 23c has a function of transmitting the current command value calculated as described above to the power-transmitting side controller 11c via the antenna 23d. The power-transmitting side controller 11c has a function of controlling the gain of the AC power in the amplifier 11 based on the current command value received from the power-receiving side controller 23c via the antenna 11d so that input electric power of the DC-DC converter 23 is constant.

Next, an operation of the power transmission system A configured as described above according to the present embodiment will be described in detail.

When the electric vehicle 200 stops near a location at which the charging facility 100 is installed, the power-transmitting side controller 11c of the power transmitting device 10 starts to control the switching element constituting the inverter 11b, and causes the voltage and frequency of the AC power output from the inverter 11b to be predetermined values. The power-transmitting side controller 11c performs control so that AC power having a frequency equaling the resonance frequency of the power-transmitting side resonator 12 is output from the inverter 11b.

As a result, at the side of the power transmitting device 10, AC power having a voltage and frequency suitable for power transmission based on the magnetic field resonance method is output from the amplifier 11 (inverter 11b) to the power-transmitting side resonator 12, and highly efficient wireless power transmission is performed between the power-transmitting side resonator 12 and the power-receiving side resonator 21 by the magnetic field resonance. The AC power output from the amplifier 11 is transmitted (wirelessly transmitted) from the power-transmitting side resonator 12 to the power-receiving side resonator 21. At the side of the power receiving device 20, the AC power received by the power-receiving side resonator 21 is converted into DC power by the rectifier 22, and is input to the DC-DC converter 23.

The power-receiving side controller 23c of the power receiving device 20 monitors an input voltage of the DC-DC converter 23 (an input voltage of the switching circuit 23a), and calculates a current command value making the input impedance of the DC-DC converter 23 equal to a preset value based on the input voltage. For example, assuming that the input voltage of the DC-DC converter 23 is V, the preset value of the input impedance is Z (for example, 45Ω), and the current command value is I, the current command value I can be calculated by Expression (1) below.

$$I = V/Z \qquad (1)$$

The power-receiving side controller 23c starts to control the switching element of the switching circuit 23a so that an input current of the DC-DC converter 23 (an input current of the switching circuit 23a) equals the current command value I. In this case, it is preferable to monitor the input current of the DC-DC converter 23 and to perform feedback control on the switching element of the switching circuit 23a so that the input current equals the current command value I.

As a result, the DC-DC converter 23 starts to be operated, the input current equaling the current command value I flows, the input impedance of the DC-DC converter 23 is held at the preset value Z, and the storage battery 40 starts to be charged by the DC power output from the DC-DC converter 23.

Thereafter, the power-receiving side controller 23c monitors the input voltage V of the DC-DC converter 23 at fixed control periods until the charging of the storage battery 40 is completed. Whenever the monitoring is carried out, the power-receiving side controller 23c calculates the current command value I making the input impedance of the DC-DC converter 23 equal to the preset value Z based on the input voltage V, and controls the switching circuit 23a so that the input current of the DC-DC converter 23 equals the current command value I.

Figure 2A:
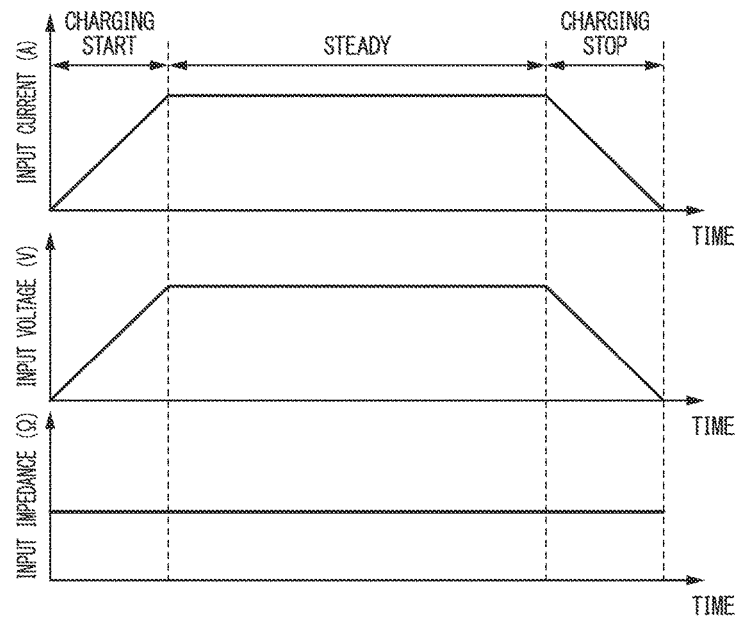
FIG. 2A is a diagram showing profiles of an input voltage, input current, and input impedance of a DC-DC converter during a charging period in the present embodiment.
Figure 2B:
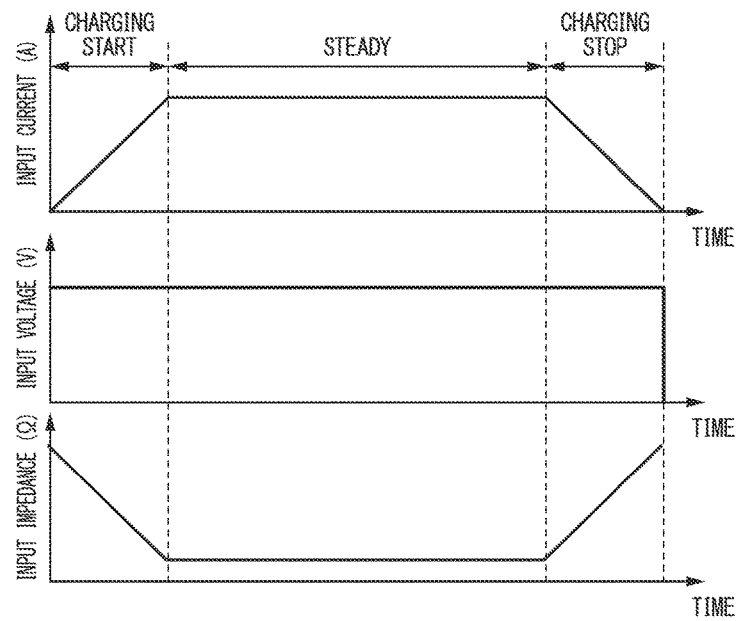
FIG. 2B is a diagram showing profiles of an input voltage, input current, and input impedance of a DC-DC converter during a charging period in the related art.

FIG. 2A is a schematic view showing profiles of the input voltage, input current, and input impedance of the DC-DC converter 23 during a charging period of the storage battery 40, for example, during an operating period of the DC-DC converter 23. FIG. 2B is a schematic view showing profiles of an input voltage, input current, and input impedance of a DC-DC converter in the related art.

As shown in these figures, it is found that the input impedance of the DC-DC converter is changed during the charging period in the related art whereas in the present embodiment, the input impedance of the DC-DC converter 23 is maintained to be constant (preset value Z) during the charging period (also including the transition times such as the charging start time and the charging stop time in addition to the steady time), and the input impedance is always maintained in a matched state.

The input electric power W of the DC-DC converter 23 is expressed by Input voltage V×Input current I (=current command value). However, depending on the current command value I, the input power W may not equal a standard value of the DC-DC converter 23. To maintain good power conversion efficiency in the DC-DC converter 23, the input power W of the DC-DC converter 23 preferably approaches the standard value as close as possible.

Therefore, in the present embodiment, the power-transmitting side controller 11c controls the gain of the AC power in the amplifier 11 so that the input power W of the DC-DC converter 23 is constant (standard value). That is, the power-transmitting side controller 11c controls the voltage of the AC power output from the inverter 11b so that the input electric power W of the DC-DC converter 23 is the standard value. As a result, the input voltage V of the DC-DC converter 23 is changed, and the input electric power W of the DC-DC converter 23 can equal the standard value.

As described above, according to the present embodiment, during the charging period of the storage battery 40, that is, during the operating period of the DC-DC converter 23 (including the transition times of the output start time (charging start time) and the output stop time (charging stop time) in addition to the steady time), the input impedance of the DC-DC converter 23 provided at the side of the power receiving device 20 is kept constant. Therefore, the input impedance is always maintained in a matched state. In comparison with the related art, the power transmission efficiency can be improved, and the damage to a constituent element can be avoided. According to the present embodiment, even when the circuit constant of the LC circuit is changed due to a change in temperature at the steady time, the input impedance of the DC-DC converter 23 can be kept constant.

The present disclosure is not limited to the aforementioned embodiment, but is limited only by the appended claims. All the shapes and combinations of the components shown in the aforementioned embodiment are only examples, and additions, omissions, substitutions, and other modifications of the constitution are possible based on, for instance, design requirements without departing from the present disclosure. For example, modifications as described below are given.

(1) In the aforementioned embodiment, the power transmission system A of the wireless power supply method that wirelessly transmits the charging power (AC power) from the charging facility 100 to the electric vehicle 200 via the space transmission path 300 is given by way of example. However, the present disclosure is not limited thereto. For example, the present disclosure may also be applied to a power transmission system that transmits power to a portable terminal using the wireless power supply method and charges a battery of the portable terminal.

(2) In the aforementioned embodiment, the example in which the power is transmitted between the power transmitting device 10 and the power receiving device 20 using the magnetic field resonance method is given. However, the present disclosure is not limited thereto, and the wireless power supply methods (for example, an electromagnetic induction method) other than the magnetic field resonance method may be used.

(3) In the aforementioned embodiment, the power transmission system A of the wireless power supply method that wirelessly transmits the AC power between the power transmitting device 10 and the power receiving device 20 via the space transmission path 300 is given by way of example. However, the present disclosure is not limited thereto, and the present disclosure may also be applied to a power transmission system that transmits AC power between a power transmitting device and a power receiving device via a wired transmission path by wire.

(4) The amplifier 11 may include the PFC as needed. In the aforementioned embodiment, the example in which the power source provided at the side of the charging facility 100 is the AC power source 30 is given. However, when the power source is a DC power source, that is, when the DC power is supplied from the power source to the power transmitting device 10, the rectifier circuit 11a may be removed from the amplifier 11. That is, the DC power may be directly supplied from the power source to the inverter 11b (in this case, the inverter 11b is equivalent to the AC converter of the present disclosure). A system in which AC power or DC power is supplied from anything other than a power source may be configured. In addition, a constitution in which bidirectional power transmission is possible between the power transmitting device 10 and the power receiving device 20 may be employed.

INDUSTRIAL APPLICABILITY

The present disclosure can be applied to a power transmission system in which power is supplied wirelessly.

What is claimed is:

1. A power transmission system comprising:
a power transmitting device configured to convert supplied alternating current (AC) or direct current (DC) power into AC power and transmit the converted AC power via a transmission path; and
a power receiving device configured to receive the AC power via the transmission path,
wherein the power receiving device comprises:
a rectifier configured to rectify the AC power received via the transmission path to DC power;
a DC converter configured to perform DC conversion on the DC power output from the rectifier; and
a power-receiving side controller configured to calculate, based on an input voltage of the DC converter, a current command value making input impedance of the DC converter equal to a preset value and to control the DC converter so that an input current of the DC converter equals the current command value, and wherein the power transmitting device comprises:

an AC converter configured to convert the supplied AC or DC power into the AC power; and a power-transmitting side controller configured to control a gain of the AC power in the AC converter;

the power-receiving side controller is configured to transmit the current command value to the power-transmitting side controller; and the power-transmitting side controller is configured to control the gain of the AC power in the AC converter based on the current command value received from the power-receiving side controller so that input power of the DC converter is constant.

2. The power transmission system according to claim 1, wherein:

the power transmitting device comprises a power-transmitting side resonator for wirelessly transmitting the AC power via a space transmission path acting as the transmission path under a magnetic field resonance method; and the power receiving device comprises a power-receiving side resonator for wirelessly receiving the AC power from the power-transmitting side resonator via the space transmission path.

3. The power transmission system according to claim 2, wherein bidirectional power transmission is possible between the power transmitting device and the power receiving device.

4. The power transmission system according to claim 1, wherein bidirectional power transmission is possible between the power transmitting device and the power receiving device.

5. The power transmission system according to claim 1, wherein:

the power transmitting device comprises a power-transmitting side resonator for wirelessly transmitting the AC power via a space transmission path acting as the transmission path under a magnetic field resonance method; and the power receiving device comprises a power-receiving side resonator for wirelessly receiving the AC power from the power-transmitting side resonator via the space transmission path.

6. The power transmission system according to claim 5, wherein bidirectional power transmission is possible between the power transmitting device and the power receiving device.

7. The power transmission system according to claim 1, wherein bidirectional power transmission is possible between the power transmitting device and the power receiving device.

8. A power receiving device of a power transmission system comprising:

a resonator configured to receive AC power transmitted from a power transmitting device;

a rectifier connected to the resonator and configured to convert the AC power into DC power;

a converter configured to perform DC conversion on the DC power and output the converted result; and a controller having functions of calculating a current command value making input impedance of the converter equal to a predetermined value based on an input voltage input to the converter, controlling the converter based on the current command value, and transmitting the current command value to the power transmitting device.

9. The power receiving device according to claim 8, further comprising an antenna configured to transmit the current command value output from the controller toward the power transmitting device.

10. The power receiving device according to claim 8, wherein the controller has a function of transmitting the current command value to the power transmitting device using a short-range radio communication standard.

11. The power receiving device according to claim 8, wherein the resonator receives the AC power from the power transmitting device using a magnetic field resonance method.

12. An electric vehicle comprising:

the power receiving device according to claim 8; and a storage battery connected to the converter.

* * * * *